US007908523B1

(12) United States Patent  
Aiello et al.

(10) Patent No.: US 7,908,523 B1
(45) Date of Patent: *Mar. 15, 2011

(54) SYSTEM AND METHOD FOR MULTIPATH I/O SUPPORT FOR FIBRE CHANNEL DEVICES

(75) Inventors: Anthony F. Aiello, Santa Clara, CA (US); Radek Aster, Campbell, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/783,964

(22) Filed: May 20, 2010

Related U.S. Application Data

(63) Continuation of application No. 12/037,651, filed on Feb. 26, 2008, now Pat. No. 7,757,128, which is a continuation of application No. 11/708,499, filed on Feb. 20, 2007, now Pat. No. 7,376,869, which is a continuation of application No. 10/092,007, filed on Mar. 6, 2002, now Pat. No. 7,210,068.

(51) Int. Cl.
*G06F 11/00* (2006.01)

(52) U.S. Cl. .......................................... 714/43; 714/56

(58) Field of Classification Search .................. None
See application file for complete search history.

(56) References Cited

U.S. PATENT DOCUMENTS

| | | | |
|---|---|---|---|
| 5,163,131 A | 11/1992 | Row et al. | |
| 5,218,601 A | 6/1993 | Chujo et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,963,962 A | 10/1999 | Hitz et al. | |
| 6,065,037 A | 5/2000 | Hitz et al. | |
| 6,145,028 A | 11/2000 | Shank et al. | |
| 6,289,356 B1 | 9/2001 | Hitz et al. | |
| 6,425,035 B2 | 7/2002 | Hoese et al. | |
| 6,769,071 B1 | 7/2004 | Cheng et al. | |
| 6,775,702 B2 | 8/2004 | Oeda et al. | |
| 6,795,934 B2 | 9/2004 | Nagata et al. | |
| 6,802,021 B1 | 10/2004 | Cheng et al. | |
| 6,883,108 B2 | 4/2005 | Lee et al. | |
| 7,210,068 B1 | 4/2007 | Aiello et al. | |
| 7,210,069 B2 | 4/2007 | Kapauan et al. | |
| 7,290,070 B2 | 10/2007 | Brice et al. | |
| 7,290,180 B2 | 10/2007 | Duron et al. | |
| 7,337,373 B2 | 2/2008 | O'Brien et al. | |
| 7,370,239 B2 | 5/2008 | Apel et al. | |

(Continued)

OTHER PUBLICATIONS

Bhide et al., "A Highly Available Network File Server", Proceedings of the Winter 1991 USENIX Conference, Jan. 21-25, 1991, pp. 199-205.

(Continued)

*Primary Examiner* — Christopher S McCarthy
(74) *Attorney, Agent, or Firm* — Cesari and McKenna, LLP

(57) ABSTRACT

A system and method enables a file server, to support multi path input/output operations for Fibre Channel devices. Upon each Fibre Channel Arbitrated Loop initialization event generated, the system and method updates a path and device instance to track multiple paths to a given device. While the file server is attempting input/output operations, the failure of a given path can be corrected by the use of another path associated with a given device. The data structures generated by the low levels of the storage operating system are exposed for use by upper level services for routing a storage device identification purposes.

30 Claims, 11 Drawing Sheets

U.S. PATENT DOCUMENTS

| | | |
|---|---|---|
| 7,373,546 B2 | 5/2008 | Nguyen et al. |
| 7,376,726 B2 | 5/2008 | Yamashita et al. |
| 7,376,766 B2 | 5/2008 | Hayashi et al. |
| 7,376,869 B2 | 5/2008 | Aiello et al. |
| 7,430,684 B2 | 9/2008 | Goodman et al. |
| 7,451,252 B2 | 11/2008 | Rooney et al. |
| 7,492,705 B1 | 2/2009 | Toman et al. |
| 7,519,744 B2 | 4/2009 | Hayashi et al. |
| 7,552,355 B2 | 6/2009 | Maharana et al. |
| 7,757,128 B1 | 7/2010 | Aiello et al. |
| 2002/0065962 A1 | 5/2002 | Bakke et al. |
| 2002/0112022 A1 | 8/2002 | Kazar et al. |
| 2002/0116593 A1 | 8/2002 | Kazar et al. |
| 2003/0023893 A1 | 1/2003 | Lee et al. |
| 2003/0126315 A1 | 7/2003 | Tan et al. |
| 2003/0160781 A1 | 8/2003 | Berndt et al. |
| 2003/0172331 A1 | 9/2003 | Cherian et al. |
| 2003/0221018 A1 | 11/2003 | Lee et al. |
| 2003/0221056 A1 | 11/2003 | Lee et al. |
| 2004/0128363 A1 | 7/2004 | Yamagami et al. |
| 2004/0267980 A1 | 12/2004 | McBrearty et al. |
| 2006/0143332 A1 | 6/2006 | Yagi et al. |
| 2007/0028014 A1 | 2/2007 | Hayashi et al. |
| 2009/0077275 A1 | 3/2009 | Zhang |
| 2009/0204733 A1 | 8/2009 | Komatsu et al. |

OTHER PUBLICATIONS

American National Standard for Information Technology, Fibre Channel—Physical and Signaling Interface (FC-PH), Nov. 14, 1994, published by American National Standards Institute, Inc., all pages.

American National Standard for Information Technology, Fibre Channel Arbitrated Loop (FC-AL-2), Dec. 8, 1999, published by American National Standards Institute, Inc., all pages.

Snively, Bob. "New Identifier Formats Based on IEEE Registration". Jan. 16, 2001. Aug. 6, 2001. Http://standards.ieee.org/regauth/oui/tutorials/fibreformat.html.

SYSTEM AND METHOD FOR MULTIPATH I/O SUPPORT FOR FIBRE CHANNEL DEVICES

RELATED APPLICATIONS

This application is a continuation of U.S. Ser. No. 12/037,651, filed on Feb. 26, 2008, by Anthony F. Aiello et al., now issued as U.S. Pat. No. 7,757,128 on Jul. 13, 2010, which is a continuation of application Ser. No. 11/708,499 filed Feb. 20, 2007 now U.S. Pat. No. 7,376,869, issued on May 20, 2008 by Anthony F. Aiello et al., which is a continuation of application Ser. No. 10/092,007 filed Mar. 6, 2002 now U.S. Pat. No. 7,210,068, issued on Apr. 24, 2007 by Anthony F. Aiello et al.

FIELD OF THE INVENTION

The present invention relates to network storage systems and, more particularly to network storage systems utilizing a Fibre Channel transport mechanism.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of data structures, e.g., disk blocks, configured to store information. A directory, conversely, may be implemented as a specially formatted file in which information about other files and directories are stored.

A filer may be further configured to operate according to a client/server model of information delivery to thereby allow many clients to access files stored on a server. In this model, the client may comprise an application, such as a database application, executing on a computer that connects to the filer over a computer network. This computer network could be a point to point link, a shared local area network (LAN), a wide area network (WAN) or a virtual private network (VPN) implemented over a public network such as the Internet. Each client may request the services of the file system on the filer by issuing file system protocol messages (typically in the form of packets) to the filer over the network.

The disk storage typically implemented has one or more storage "volumes" comprised of a cluster of physical storage disks, defining an overall logical arrangement of storage space. Currently available filer implementations can serve a large number of discrete volumes (150 or more, for example). Each volume is generally associated with its own file system. The disks within a volume/file system are typically organized as one or more groups of Redundant Array of Independent (or Inexpensive) Disks (RAID). RAID implementations enhance the reliability and integrity of data storage through the redundant writing of data stripes across a given number of physical disks in the RAID group, and the appropriate caching of parity information with respect to the striped data. The redundant information enables recovery of data lost when a storage device fails.

In the operation of a storage system comprising, for example, a number of filers, disk shelves, switches and other routing and networking devices, it is possible that a device will fail or suffer an error condition. A principle goal of a high-performance storage system is to ensure that data read/write operations can be performed even when a component of a storage network has failed. In one common implementation of a storage system, the physical disks used to store data may be connected to the file server by a Fibre Channel connection. Fibre Channel is a series of protocols defining a transport mechanism for high-speed data access. Fibre Channel a collection of different specifications which are defined in a variety of documents published by the American National Standards Council. These various Fibre Channel standards are available from the Fibre Channel Industry Association of San Francisco, Calif. Specifically, disks may be interconnected with a computer through a Fibre Channel Arbitrated Loop architecture. This architecture is defined in Fibre Channel Arbitrated Loop (FC-AL-2), published by the American National Standards Council, which is hereby incorporated by reference. With the use of Fibre Channel switches and other networking devices, an overall switching fabric of interconnected switches, disks and file servers can be provided. Many Fibre Channel disks employ dual connectors, labeled A and B. Through the use of the dual connectors, the disk can support connections through two discrete data paths. Typically, this dual-connection is used to provide a redundant second data path in the event of a failure of a first path. Note that by "data path" or "path" it is herein meant generally a connection from a file server to a storage device through various interconnections such as switches, disk shelves or other disks.

The Fibre Channel transport mechanism is a token-ring protocol. By "token-ring protocol" it is meant generally that each node in a Fibre Channel switching network participates in each data transaction at least to the point of buffering and retransmitting the data. This arrangement can be disadvantageous in certain circumstances. For example, should any node in a Fibre Channel network fail, the ring is broken and data will not reach its intended destination. Additionally, errors or failures in the physical cabling can result in a break of the ring with its associated loss of data delivery. These breaks in the Fibre Channel network can result in data failing to reach its destination and, in a file server environment, data loss or corruption.

In non-multi-path systems utilizing file servers and a plurality of data paths to and from disks, a low-level device driver operates to effectuate the multi-path operation of the disks. This can be accomplished, for example, by using a static routing table identifying the multiple paths from a file server to a given disk device. However, a noted disadvantage of known multi-path operations is that upper level services of the operating system are not exposed to, or do have access to, such routing information. Such upper level services generally include higher layers of an operating system above a disk driver or a routing layer, for example, a disk storage layer, a file system layer and a user interface or maintenance layer. It should be noted that the term "upper level services" should not be construed to only include these named storage operating system layers, but to include any other layers or processes executing on a computer that implements the teachings of this invention. Such upper level services can fail in the event of a path failure. The failure of such upper level services can result from the service remaining unaware of the existence of or use of multiple data paths to a given storage device. Such upper level services can fail, even though the lower level routing or disk driver layers are still capable of delivering data and input/output operations to a given storage device.

SUMMARY OF THE INVENTION

The present invention overcomes the disadvantages of the prior art by providing a system and method for supporting multi-path operations for Fibre Channel devices in which lower-level data routing information is accessible to upper level services of an operating system.

The system and method develop a linked-list of data paths to a particular device. When an input/output (I/O) operation is attempted, a data path is selected from the linked list. The I/O operation is then attempted using this data path. If the I/O operation fails, another data path is selected from the linked list and the I/O operation is attempted with this new data path.

A routing administrator layer of a storage operating system develops a linked list of paths to various storage devices. These linked lists are updated in real-time as new information is available via Fibre Channel Arbitrated Loop initialization events from the various Fibre Channel loops connected to a given file server. The routing administrator layer reviews the Fibre Channel Arbitrated Loop initialization event generated by a change in the loop configuration. The routing administrator layer adds, removes or changes one of the paths contained in the linked lists of paths in response to the event generated. These linked lists are accessible via an application program interface to upper level services of the storage operating system for use in routing or identifying disks to be utilized.

When the file server attempts an input/output (I/O) operation, a first path to the device is selected and utilized. If there is an error condition with the attempted I/O operation, the routing administrator layer selects a new path from linked lists of paths, and retries the I/O operation using the newly selected path. By continually updating the set of paths to a given storage device, a file server can dynamically provide multi-path operation to storage devices. By exposing the linked lists of paths to the storage devices, upper level services can properly determine various routing information and the status of the storage devices.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 1:
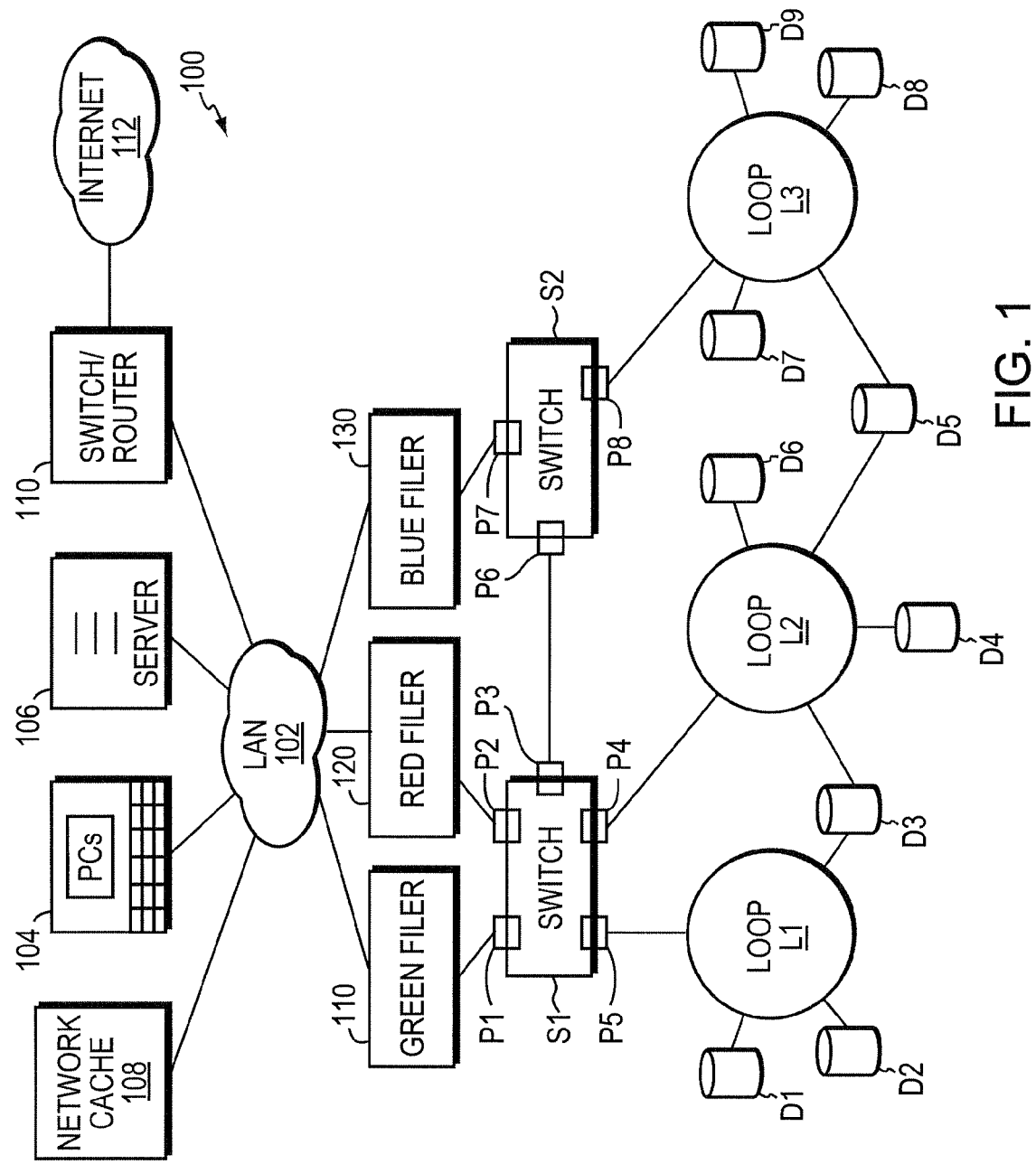
FIG. 1 is an exemplary network environment including filers, clients, associated components.

FIG. 1 is a schematic block diagram of an exemplary network environment 100 in which the principles of the present invention are implemented. The network 100 is based around a local area network (LAN) 102 interconnection. However, a wide area network (WAN) virtual private network (VPN) utilizing communication links over the Internet, for example, or a combination of LAN, WAN and VPN implementations can be established. For the purposes of this description, the term LAN should be taken broadly to include any acceptable networking architecture. The LAN interconnects various clients based upon personal computers 104, servers 106 and a network cache 108. Also interconnected to the LAN may be switch/router 110 which provides a gateway to the well-known Internet 112 thereby enabling various network devices to transmit and receive Internet based information, including email, web content, and the like.

Exemplary filers, including green, red, and blue filers 110, 120, and 130 respectively, are connected to the LAN 102. These filers, described further below, are file servers configured to control storage of, and access to, data in a set of interconnected storage volumes. As described further below, each volume is typically organized to include one or more RAID groups of physical storage disks for increased data storage integrity and reliability. Each of the devices attach to the LAN include an appropriate conventional network interface arrangement (not shown) for communicating over the LAN using desired communication protocols such as the well-known Transport Control Protocol/Internet Protocol (TCP/IP), User Datagram Protocol (UDP), Hypertext Transfer Protocol (HTTP), or Simple Network Management Protocol (SNMP).

The filers are also connected to a plurality of switches S1 and S2. The switches are preferably Fibre Channel switches each connected to one or more Fibre Channel loops L1, L2 and L3. The loops utilize the Fibre Channel Arbitrated Loop architecture for signaling and control. The Fibre Channel Arbitrated Loop architecture is described further in the above-incorporated Fibre Channel Arbitrated Loop Specification.

Disks D1-D9 are connected to the various loops L1, L2 and L3. These physical disks comprise volume served by the file servers. Disk D3 is shown as being interconnected to both loop L1 and loop L2. Similarly disk D5 is connected to loops L2 and L3. These dual-connected disks are connected to the loops through the use of the disks' A/B port connectors. These dual connections provide for multipath support to the disks in the event of a loop or switch failure. Thus, for example if switch S2 fails, disk D5 is still be accessible via loop L2 and switch S1. Similarly, if loop L1 fails, disk D3 is still accessible via loop L2.

B. File Servers

Figure 2:
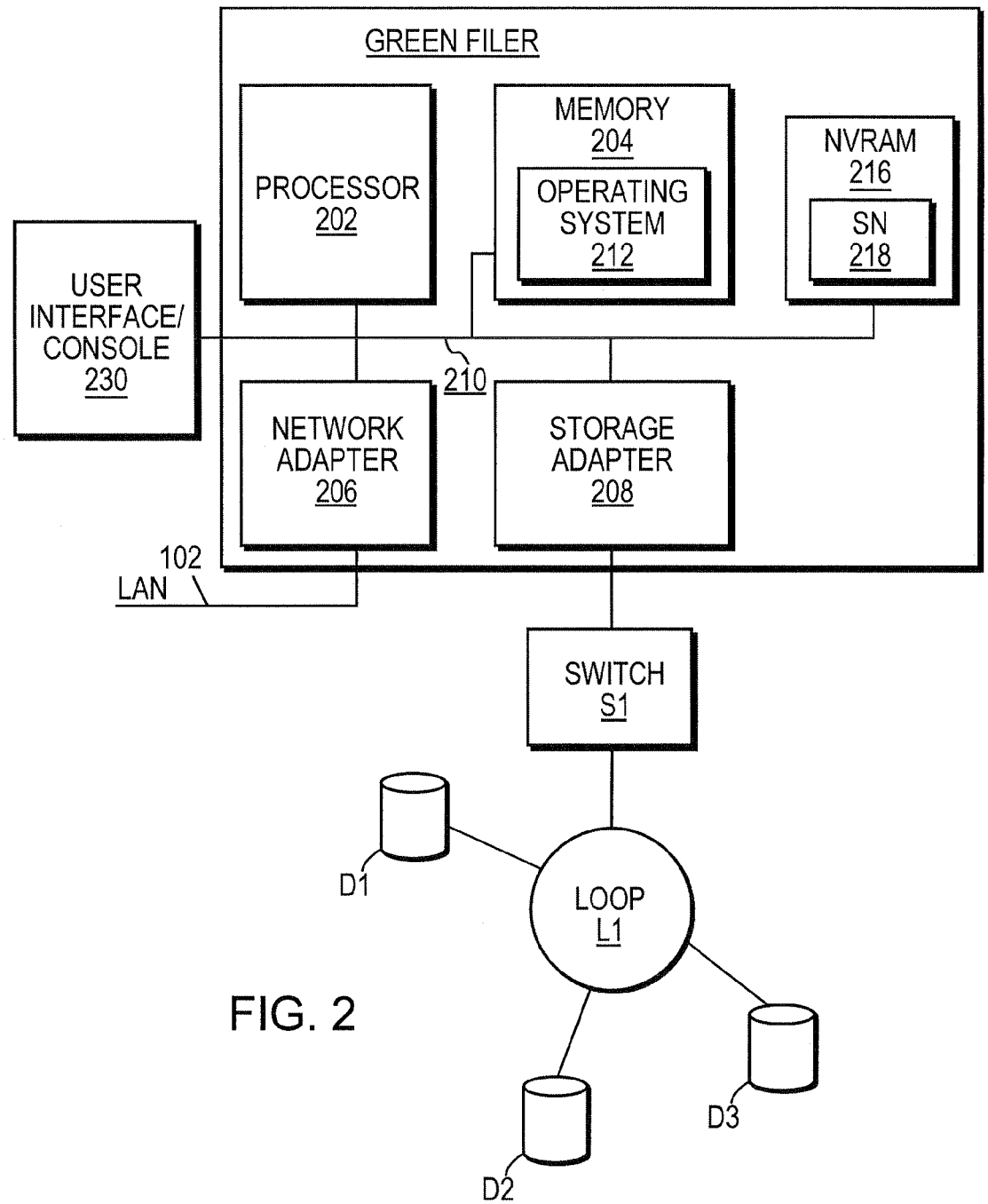
FIG. 2 is a schematic block diagram of an exemplary filer in accordance with the teachings of this invention.

FIG. 2 is a more-detailed schematic block diagram of an exemplary file server 110 that is advantageously used with the present invention. Other file servers can have similar construction. By way of background, a file server, embodied as a filer, is a special-purpose computer that provides file service relating to the organization of information on storage devices, such as disks. However, it will be understood by skilled in the art that the inventive concepts described herein may apply to any type of special-purpose computer or general-purpose computer, including a stand-alone computer. The filer comprises a processor 202, a memory 204, a network adapter 206 and a storage adapter 208 and interconnected by a system bus 210. It may also include a non-volatile random access memory (NVRAM) 216 for storing requests in event of a service disruption. The filer also includes, within memory 204, a storage operating system 212 that implements the file system to logically organize the information as a hierarchical structure of directories and files on the disks.

In the illustrative embodiment, the memory 204 may have storage locations that are addressable by the processor and adapters for storing software program code where data structures associated with the present invention. The processor and adapters, may in turn, comprise processing elements and/or logic circuitry configured to execute the software code and manipulate the data structures. The storage operating system 212, portions of which are typically resident in memory and executed by the processing elements, functionally organize a filer by invoking storage operations in support of a file service implemented by the filer. It will be apparent to those skilled in the art that other processing and memory implementations, including various computer-readable media, may be used for storing and executing program instructions pertaining to the inventive technique described herein.

The network adapter 206 comprises the mechanical, electrical and signaling circuitry needed to connect the filer to a client over the computer network, which as described generally above, can comprise a point-to-point connection or a shared medium such as a LAN. A client can be a general-purpose computer configured to execute applications including file system protocols, such as the Common Internet File System (CIFS) protocol. Moreover, the client can interact with the filer in accordance with the client/server model of information delivery.

The storage adapter cooperates with the storage operating system 212 executing in the filer to access information requested by the client. The information may be stored in a number of storage volumes, each constructed from an array of physical disks D1, D2, and D3. The disks are, in a Fibre Channel environment, connected to a Fibre Channel loop L1, which may be interconnected to a switch S1. The switch S1 would be operatively interconnected with the storage adapter 208 of the filer 110.

The storage adapter 208 includes input/output (I/O) interface circuitry that couples to the disks over an I/O interconnect arrangement such as a conventional high-speed/high-performance Fibre Channel serial link topology. The information is retrieved by the storage adapter, and if necessary, processed by the processor (or the adapter itself) prior to being forwarded over the system bus to the network adapter, where the information is formatted into a packet and returned to the client.

To facilitate access to the disks, the storage operating system 212 implements a file system that logically organizes the information as a hierarchical structure of directories in files on the disks. Each on-disk file may be implemented as a set of disk blocks configured to store information such as text, whereas the directory may be implemented as a specially formatted file in which other files and directories are stored. In the illustrative embodiment described herein, the storage operating system associated with each volume is preferably the NetApp® Data ONTAP™ operating system available from Network Appliance Inc. of Sunnyvale, Calif. that implements a Write Anywhere File Layout (WAFL™) file system. The preferred operating system for the exemplary filer is now described briefly. However, it is expressly contemplated that the principles of this invention can be implemented using a variety of alternate operating system architectures.

C. Storage Operating System

Figure 3:
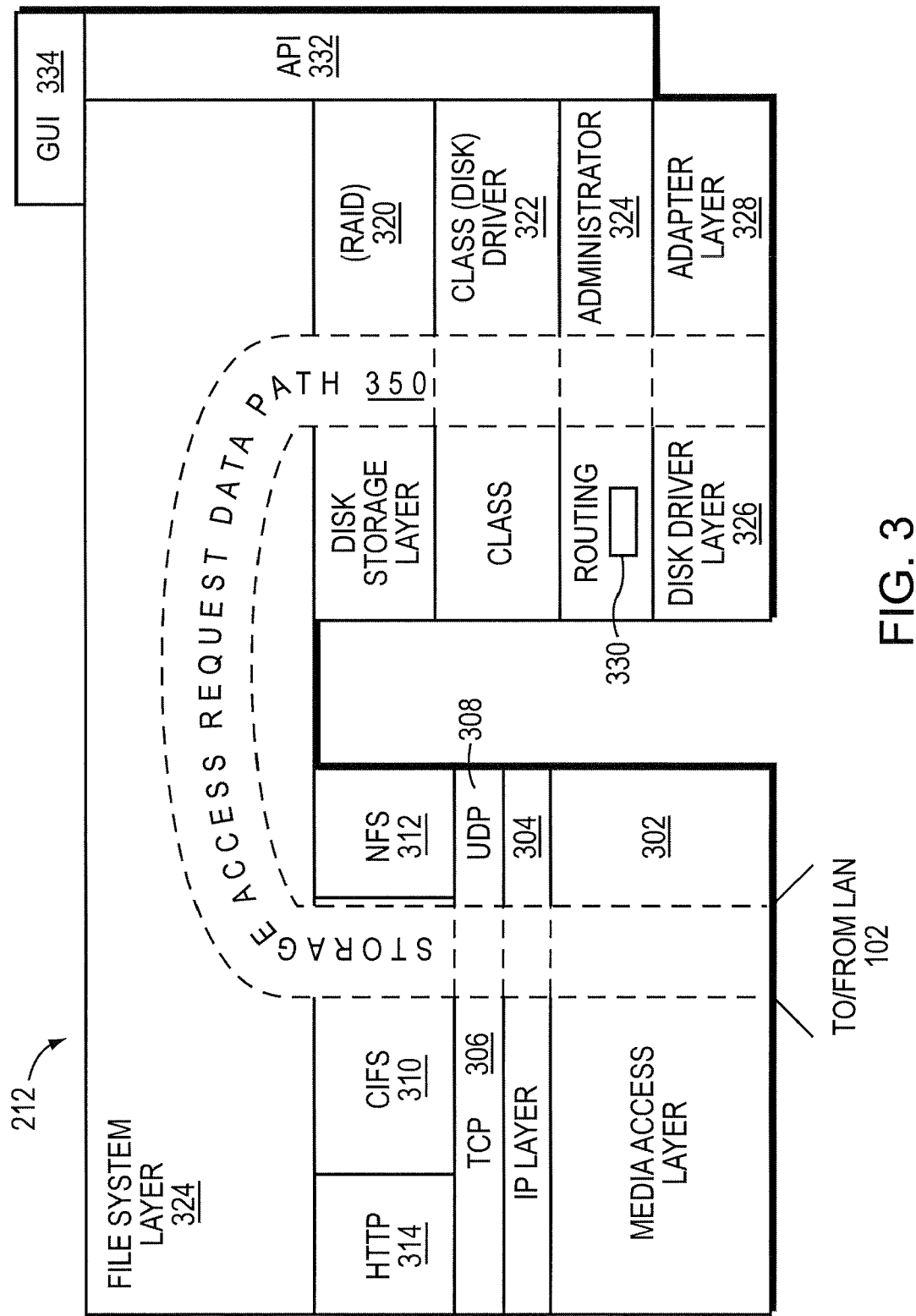
FIG. 3 is a schematic block diagram of an exemplary storage operating system for use with the file server of FIG. 2.

As shown in FIG. 3, the storage operating system 212 comprises a series of software layers including a media access layer 302 of network drivers (e.g., an Ethernet driver). The storage operating system further includes network protocol layers such as the IP layer 304 and its TCP layer 306 and a UDP layer 308. A file system protocol layer provides multi-protocol data access and, to that end, includes support from the CIFS protocol 310, the Network File System (NFS) protocol 312 and the HTTP protocol 314.

In addition, the storage operating system 212 includes a disk storage layer 320 that implements a disk storage protocol such as a RAID protocol.

The storage operating system 212 also includes a set of class drivers 322, a routing administrator layer 324, a disk driver layer 326 and an adapter layer 328. The class drivers layer 322 includes a plurality of drivers for various classes of devices such as, e.g., disk drives. The routing administrator level 324 works to route data access or I/O requests through various paths available to the appropriate storage device. A disk driver layer 326 implements a disk access protocol such as e.g., a Small Computer System Interface (SCSI) protocol. The adapter layer provides access to various storage or other adapters operatively interconnecting the file server and the various storage media.

The routing administrator layer 324 includes a number of device instances 330. Each device instance, described further below, is associated with a particular storage device. A device instance is a data structure created and maintained by the routing administrator layer to store various information regarding a particular device. The routing administrator layer 324 utilizes the various device instances to store information relating to multipath operation in accordance with this invention.

Adjacent to the routing administrator layer 324 is an application program interface (API) 332. This API provides function calls that permit upper level services, including for example, the file system layer 324, the disk storage layer 320, the classed drivers 322 and a graphical user interface 334 to access the various device and path instances associated with the storage devices. By providing this API, the routing administrator can permit upper level services to read the data contained in the device and path instances. Thus, upper level services can properly determine if a disk or storage device has actually failed, or if only a path to the storage device has failed. The use of the API and upper level service activity is described further below.

As used herein, the term "storage operating system" generally refers to the computer-executable code operable on a computer that manages data access and may, in the case of a filer, implement file system semantics (such as the Data ONTAP™ storage operating system) implemented as a microkernel, and available from Network Appliance, Inc. of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Bridging the disk software layers with the network and file system protocol layers is a file system layer 324 of the storage operating system. Generally, the file system layer 324 implements the file system having an on-disk file format representation that is block-based. The file system generates operations to load/retrieve the requested data of volumes if it is not resident "in-core", i.e., in the filer's memory. If the information is not in memory, the file system layer indexes into the mode file using the mode number to access an appropriate entry and retrieve a logical block number. The file system layer then passes the logical volume block number to the disk storage/RAID layer, which maps out logical number to a disk block number and sends the later to an appropriate driver of a disk driver layer. The disk driver accesses the disk block number from volumes and loads the requested data into memory for processing by the filer. Upon completion of the request, the filer and operating system return a reply, e.g., a conventional acknowledgement packet defined by the CIFS specification, to the client over the network. It should be noted that the software "path" 350 through the storage operating system layers described above, needed to perform data storage access for the client received the filer, may ultimately be implemented in hardware, software or a combination of hardware and software.

D. Multipath Operation

Figure 4:
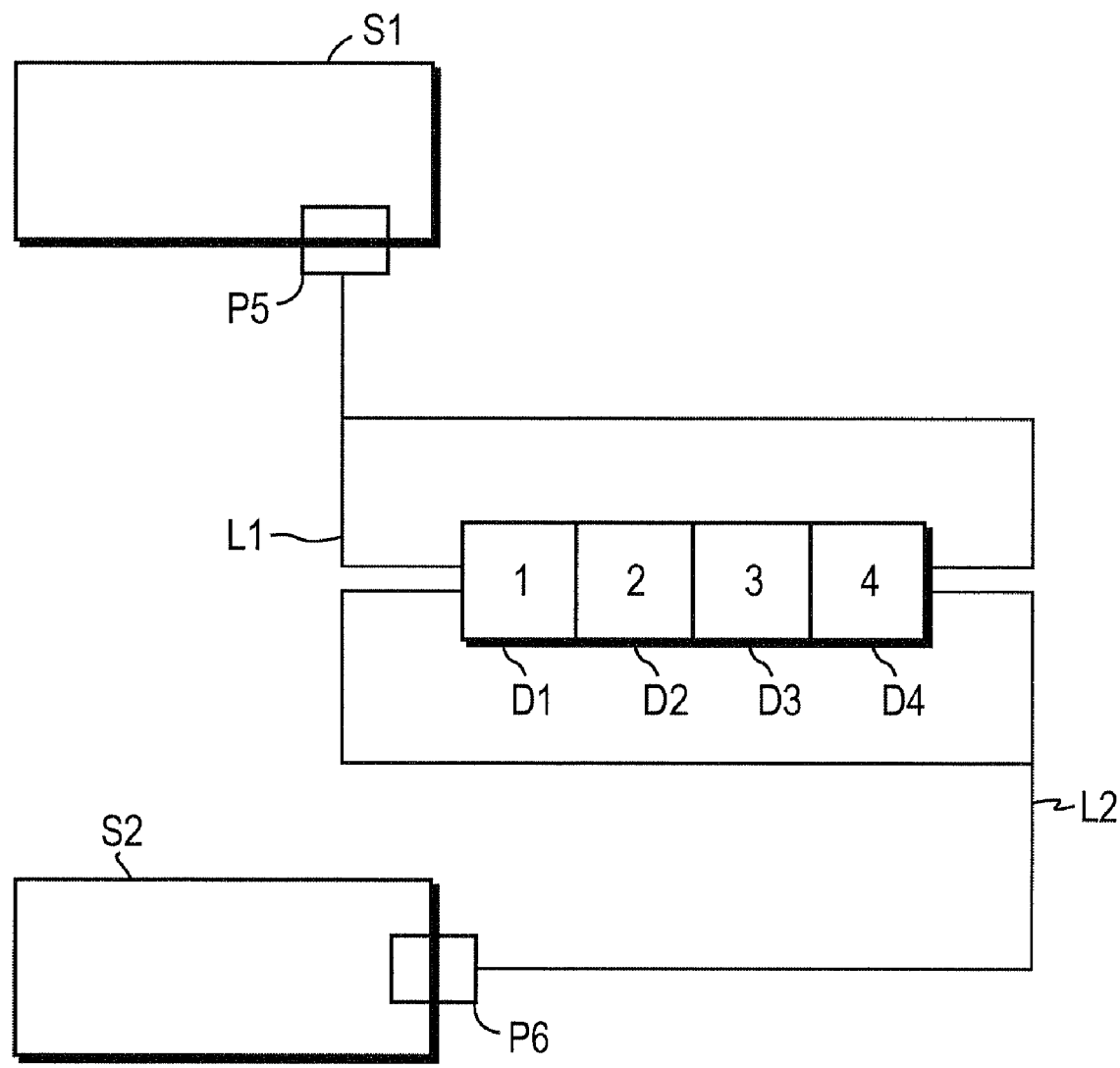
FIG. 4 is a schematic block diagram of an exemplary disk shelf supporting a multi-path environment.

FIG. 4 is a schematic block diagram of an exemplary multipath environment suitable for use in accordance with the teachings of this invention. In the illustrative embodiment, a disk shelf 402 is comprised of disks D1, D2, D3 and D4. Switch S1 is connected to Fibre Channel loop L1 through port P5 of the switch. This Fibre Channel loop L1 is connected to the disk shelf 402 and each individual disk D1-D4 through the A/B ports of the disks. Similarly switch S2 is connected to the Fibre Channel loop L2 via switch port P6. Loop L2 is also connected to the disk array 402 and the disks D1-D4. Assuming, that switch 51 and S2 are accessible by various file servers (not shown), there are two alternate "paths" to reach disks D1-D4. For example, if switch S2 should fail, the disk shelf 402 is still accessible via switch 51. Similarly, switch S2 would provide a redundant data path to disks D1-D2 should switch S1 fail.

By "path" it is meant generally a link from one device to another via an intervening Fibre Channel network that may consist of, e.g., cabling, disk drives or disk shelves and Fibre Channel switches or other routing devices. Thus an exemplary path from the green filer 100 to disk D3 in FIG. 1 would consist of the physical cabling from the green filer 110 to the switch S1, the switch S1 itself and the loop L1 from the switch S1 to disk D3. Loop L1 would pass through disks D1 and D2 so that disks D1 and D2 would also comprise part of the path to disk D3. An alternate path from the green filer 110 to disk D3 would be the physical cabling from the green filer 110 to the switch S1, switch S1 itself, and then Fibre Channel loop L2 to disk D3. As disk D3 is the first disk on the loop L2, the path would not include any other disks.

Referring again to FIG. 3, the routing administrator layer 324 of the storage operating system 212 forms a device instance associated with each physical device connected to a given file server. Each device instance, which is a data structure utilized by the storage operating system 212 to hold various data regarding a device, includes a linked list of path instances. By "device" it is meant anything that is operatively interconnected with the file server and can accommodate I/O operations, including, for example, disk and tape drives. Each path instance describes a path from the file server to the given storage device. These device instances, and their associated path instances, are generated by a technique described further below.

Figure 5:
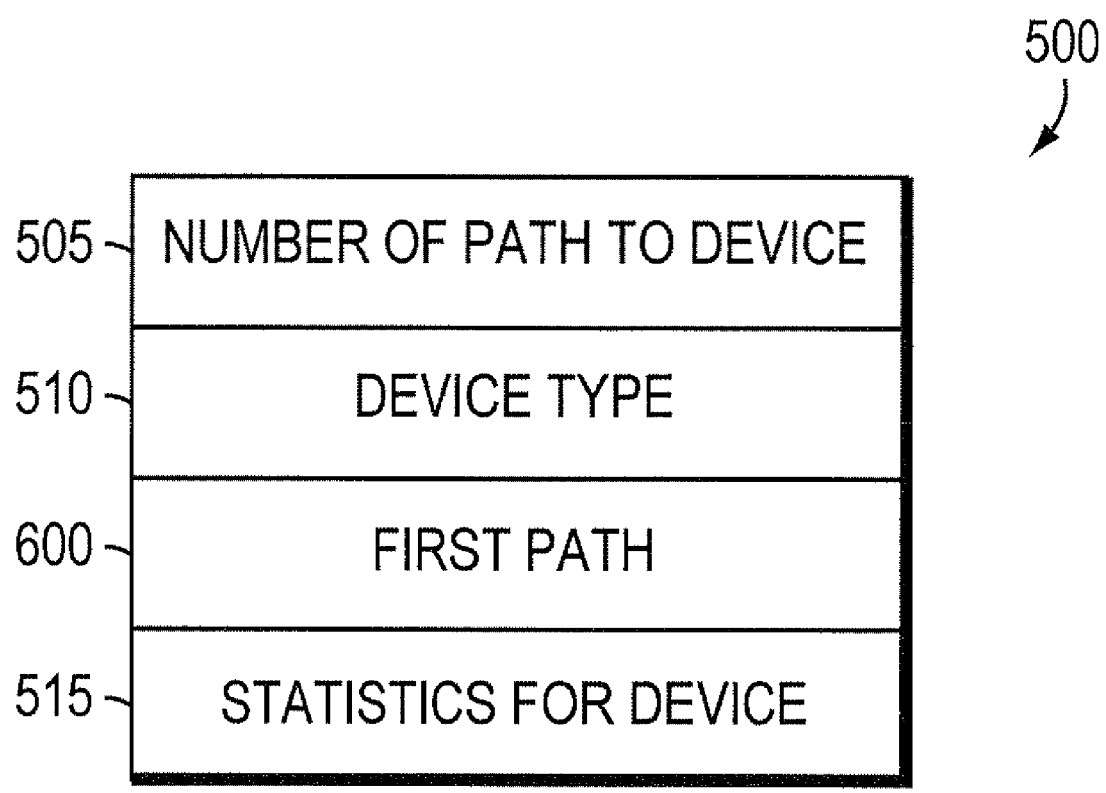
FIG. 5 is a block diagram of an exemplary device instance used by the storage operating system in accordance with the teachings of this invention.

An exemplary device instance 500 is shown in FIG. 5. The device instance 500 is stored in the routing administrator layer of the storage operating system (212). The device instance 500 includes fields for the number of paths to device 505, the device type 510, the first path 600 and statistics for the device 515. The number of paths to device field 505 is the number of alternate paths to the particular device. These alternate paths are identified by the methodology described further below in reference to path instances. The device type field 510 identifies the type of device such as e.g. a disk drive. The statistics for device field 515 stores various data related to the associated device, including e.g. the last time the device was accessed. The first path field 600 is a pointer to the first path instance 600 (see FIG. 6) associated with this particular device.

Figure 6:
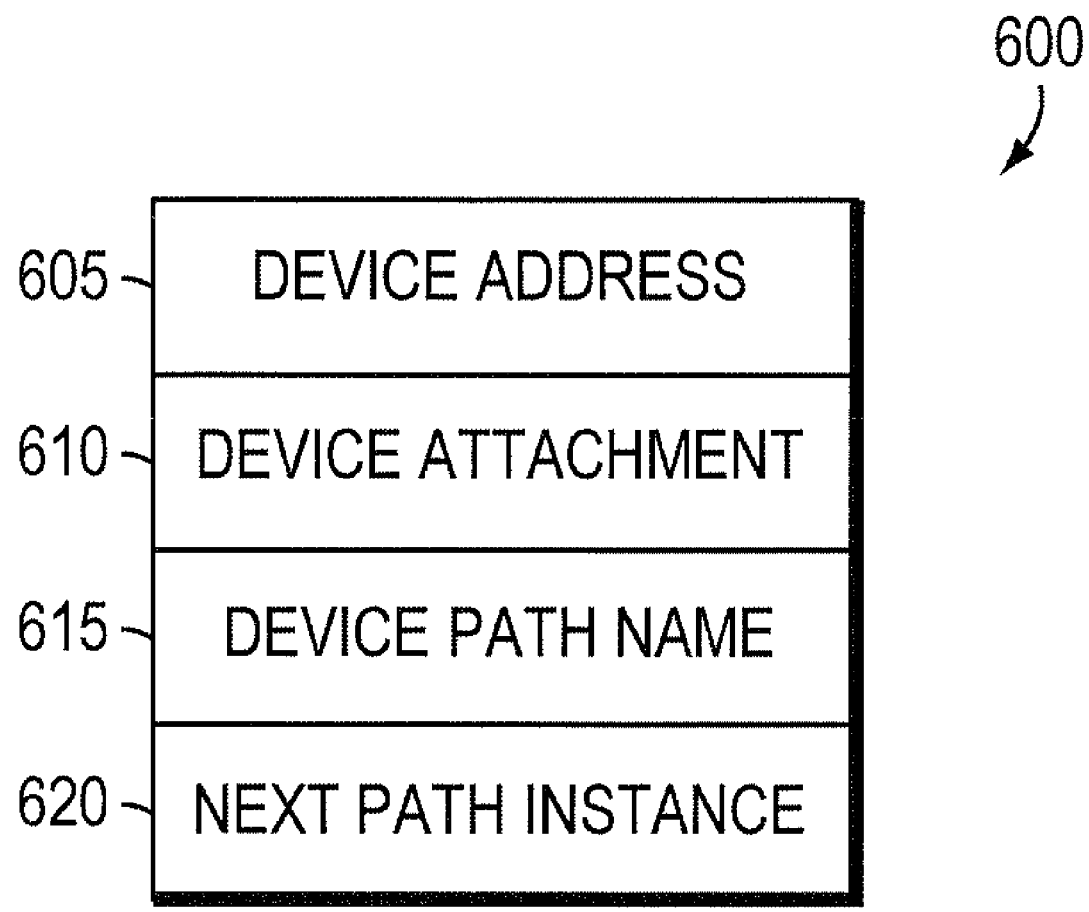
FIG. 6 is a block diagram of an exemplary path instance in accordance with the teachings of this invention.

An exemplary path instance 600 in accordance with an embodiment of this invention is shown schematically in FIG. 6. The path instance 600 includes fields for the device address 605, the device attachment 610, the device path name 615, and the next path instance 620. The device address field 605 contains the Fibre Channel address associated with the device. The device attachment field 610 identifies the method or adapter to which the device is attached on the filer. The device path name field 615 contains the path name from the file server to the particular device. The next path instance field 620 is a pointer to the next path instance associated with a particular device instance. Thus, for devices with multiple paths, the path instances form a linked list.

Figure 7:
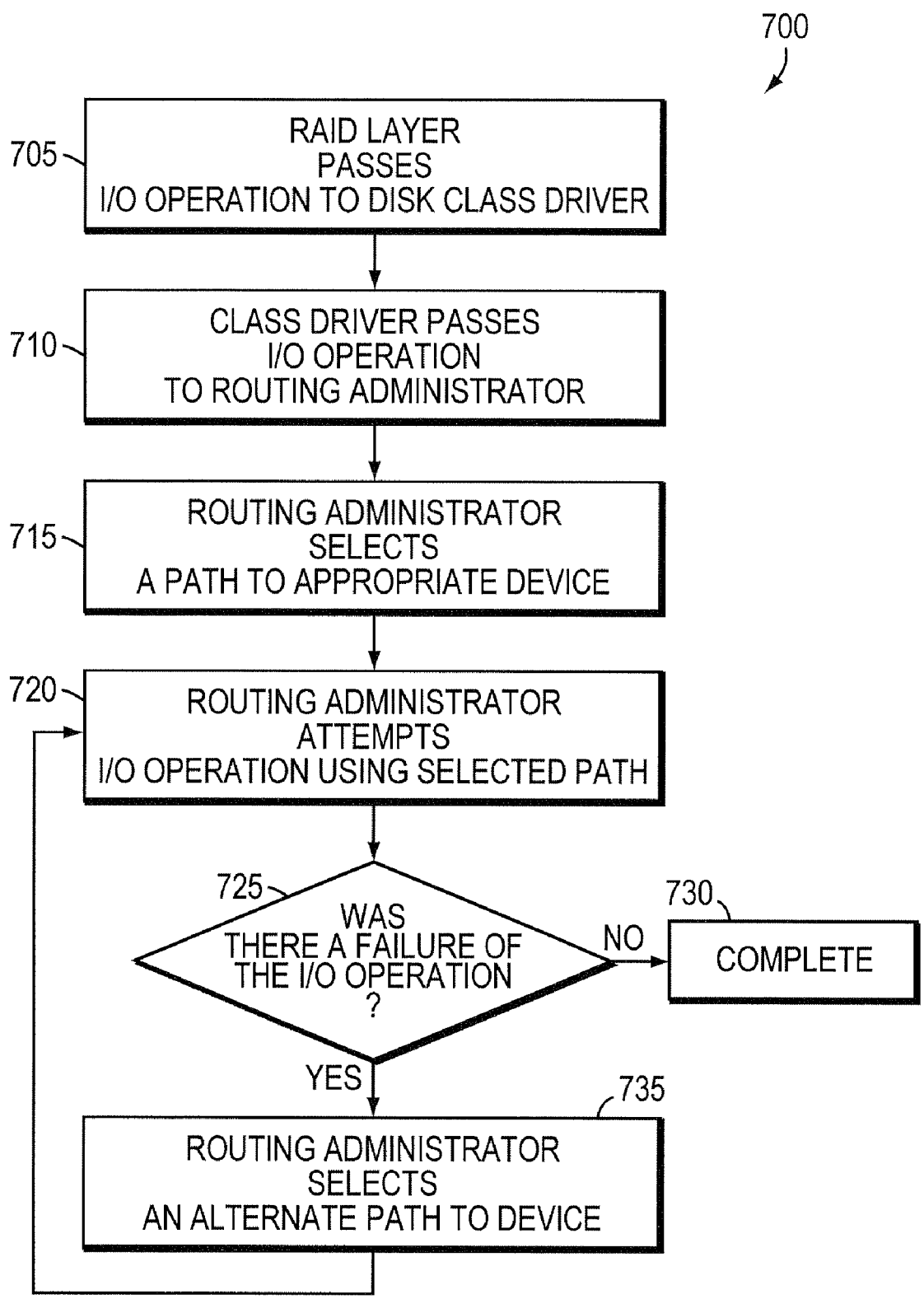
FIG. 7 is a flow chart detailing the process performed by the storage operating system in processing disk events accordance with the teachings of this invention.

FIG. 7 is a flow chart detailing the process performed by a file server supporting disks that are connected via multiple data paths. In step 705 the RAID layer passes an input/output (I/O) operation to the disk class driver to be performed. By "I/O operation" it is meant a device access operation that the associated device should perform, e.g. data read or write operation. The disk class driver then passes the I/O operation to the routing administrator layer of the storage operating system in step 710. The routing administrator selects a path to the appropriate device to perform the I/O operation (step 715). This path can be selected in a variety of ways, for example, the last used path to a particular device. In alternate embodiments, the path to be used is the first path in the linked list of path instances.

In step 720, the routing administrator attempts the I/O operation using the selected path. Next, in step 725, the routing administrator determines if there has been a failure of the I/O operation. Such a failure could occur because, e.g., a switch or Fibre Channel loop utilized in the selected path has failed or suffered an error condition. If there has been no failure, the I/O operation is completed (step 730) and an appropriate confirmation signal or message is passed from the routing administrator to the class driver. If there has been a failure of the I/O operation, the routing administrator selects an alternate path to the device (step 735), if an alternative path is available. This alternate path can be selected in a variety of ways, including, for example, utilizing the next path instance in the linked list of path instances. Once this alternate path is selected, the process loops to step 720, where the routing administrator attempts the I/O operation using the selected alternate path.

Figure 8:
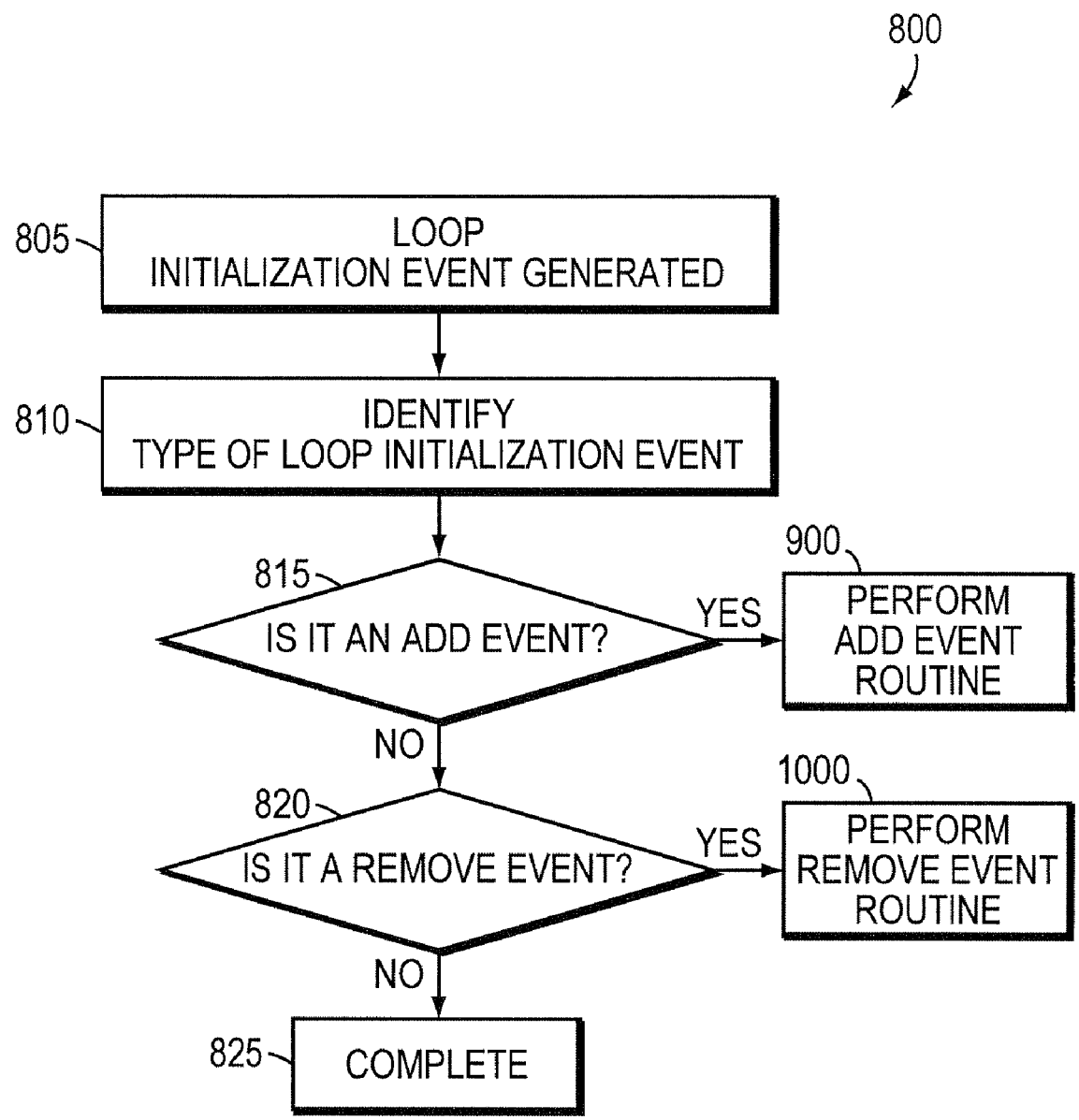
FIG. 8 is a flow chart detailing the procedure performed by the routing administrator layer upon receipt of a Fibre Channel Arbitrated Loop initialization event in accordance with an embodiment of this invention.
Figure 9:
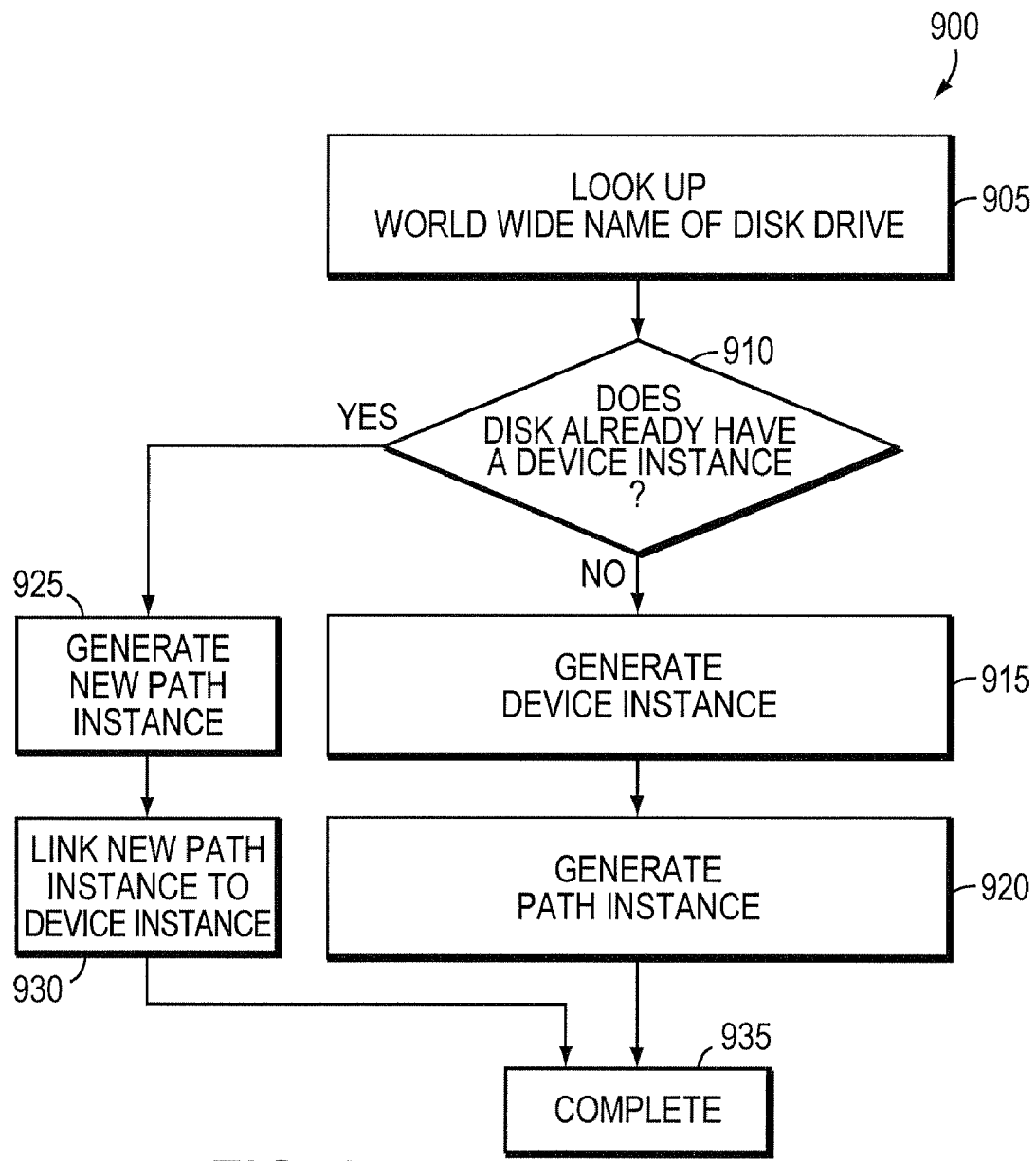
FIG. 9 is a flow chart detailing the procedure performed by the routing administrator layer upon receipt of a ADD event in accordance with an embodiment of this invention.
Figure 10:
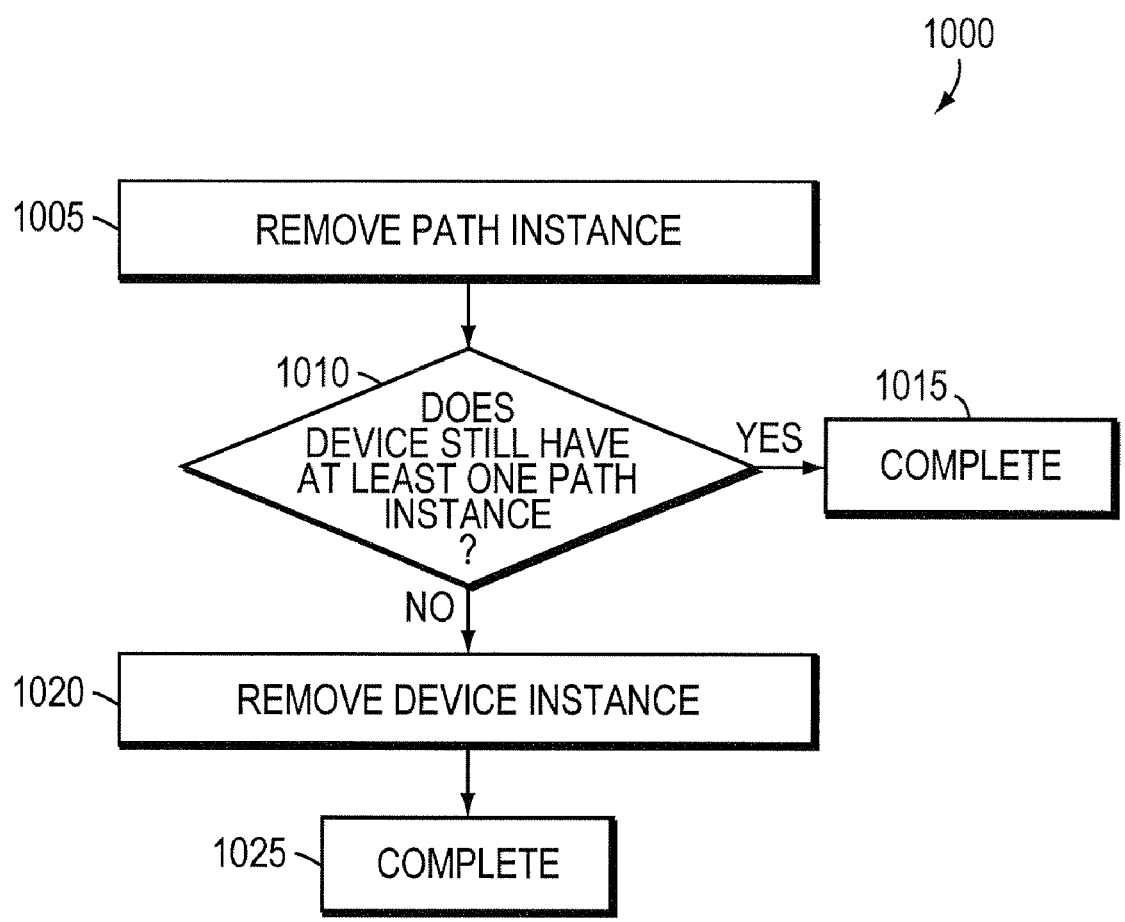
FIG. 10 is a flow chart detailing the procedure performed by the routing administrator layer upon receipt of a REMOVE event in accordance with an embodiment of this invention.

FIGS. 8 through 10 detail the procedure performed by the routing administrator layer in generating and maintaining the device and path instances associated with disk drives. Specifically, FIG. 8 is a flow chart of the process 800 performed by the routing administrator upon receipt of a Fibre Channel Arbitrated Loop initialization event. In step 805, a Fibre Channel Arbitrated Loop initialization event is generated. Such Fibre Channel Arbitrated Loop initialization (ADD/REMOVE/PATH CHANGE events) can be generated by a variety of actions, including the addition/removal of disk drives to a Fibre Channel loop. These Fibre Channel Arbitrated Loop initialization events are described in further detail in the above-incorporated Fibre Channel arbitrated loop specification. The routing administrator next identifies the type of Fibre Channel Arbitrated Loop initialization event in step 810. It would be known to one of ordinary skill in the art to analyze the various Fibre Channel Arbitrated Loop initialization events to determine the type of event generated and to retrieve the appropriate data from the Fibre Channel loop using, for example, the appropriate commands implemented in accordance with the standard SCSI command structure. Next, in step 815, the routing administrator level determines if the Fibre Channel Arbitrated Loop initialization event is an ADD event. An ADD event would be generated from the addition of a path and/or disk drive to a Fibre Channel loop. For example, if a new disk were connected to a disk shelf, which is connected to a Fibre Channel loop to the filer, an ADD Fibre Channel Arbitrated Loop initialization event would be generated. If the event generated is an ADD event, the routing administrator performs the ADD event routine 900 defined further below. If the event is not an ADD event, the routing administrator determines whether it is a REMOVE event (step 820). A REMOVE event is generated when, for example, a disk drive is physically removed from a disk shelf, or when a disk drive fails. If it is a REMOVE event, the routing administrator then performs REMOVE event routine 1000 described further below. If the event generated is not a REMOVE event, the routing administrator completes its handling of the Fibre Channel Arbitrated Loop initialization event (step 825).

FIG. 9 shows the process 900 performed by the routing administrator to handle an ADD event. In step 905, the routing administrator looks up the world wide name of the disk drive. A world wide name is a unique identifier provided to each disk drive by its manufacturer. The world wide name is a 64-byte identification number which is unique for every item attached to a Fibre Channel network. World wide names are described in ANSI X3.230-1995, *Fibre Channel Physical and Signaling Interface (FC-PH)* and Bob Snively, *New Identifier Formats Based on IEEE Registration X*3T11/96-467, revision 2, which are hereby incorporated by reference. The world wide name is generally inserted into disk drives at an accessible location during their manufacturing process. After looking up the worldwide name of the disk generating the Fibre Channel Arbitrated Loop initialization event, the routing administrator determines if that disk already has a device instance associated with it in step 910. If the device does not have a device instance associated with it, the routing administrator generates a device instance associated with that disk drive in step 915. The routing administrator layer also generates a path instance (step 920) associated with the path to the disk from this particular Fibre Channel Arbitrated Loop initialization event. This newly generated path instance is linked to the device instance as the first path field of the device instance. After generating the path instance, the routing administrator layer has completed its processing of this Fibre Channel Arbitrated Loop initialization event step 913.

If the disk already has a device instance associated with it, the routing administrator generates a new path instance in step 925. The routing administrator then links this newly generated path instance to linked list of path instances associated with an existing device instance in step 930. After linking the path instance to the device instance, the process is complete (step 935).

FIG. 10 is a flow chart of the procedure 1000 associated with the routing administrators handling of receipt of a REMOVE event. In step 1005, the routing administrator removes the path instance associated with this particular path or disk drive. Next, in step 1010, the routing administrator determines if the device still has at least one path instance associated with it. If one path instance is still associated with a particular device instance, the routing administrator is complete (step 1015). Otherwise, if no path instances still exist that are affiliated with a given device instance, the routing administrator removes the device instance (step 1020). After removal of the device instance, the routing administrator has completed its processing (step 1025).

To again summarize, the routing administrator layer of the storage operating system dynamically creates and maintains a device instance associated with each storage device. The routing administrator layer also creates and updates a linked list of path instances associated with each device. These path instances represent each known path from the file server to a given storage device. By dynamically updating these device and path instances from information generated by Fibre Channel Arbitrated Loop initialization events from the various Fibre Channel loops operatively interconnected with a given filer, the routing administrator layer can attempt input/output operations using alternate data paths should one data path fail or have an error condition.

When an I/O operation is attempted, the routing administrator layer first selects a data path to use for the I/O operation. The adapter associated with the selected data path then attempts the I/O operation using that selected data path. Should the operation fail, the routing administrator layer may select an alternate data path, if one exists, from the linked list that it maintains. After selecting an alternate data path, the adapter associated with this alternate data path then attempts the operation using the alternate data path. This selection of alternate data paths continues until the I/O operation succeeds or all known data paths have been attempted.

Moreover, the routing administrator layer exposes the device and path instances for access to other layers and services of the storage operating system through an application program interface (API). This exposure permits these upper level services to access physical disks even though the paths to such disks have changed. In alternative embodiments, the routing administrator layer may notify the upper level services when a change in data paths has occurred. The upper level services can, using function calls with the API, discern the nature of the change. This will now be described in further detail.

Figure 11:
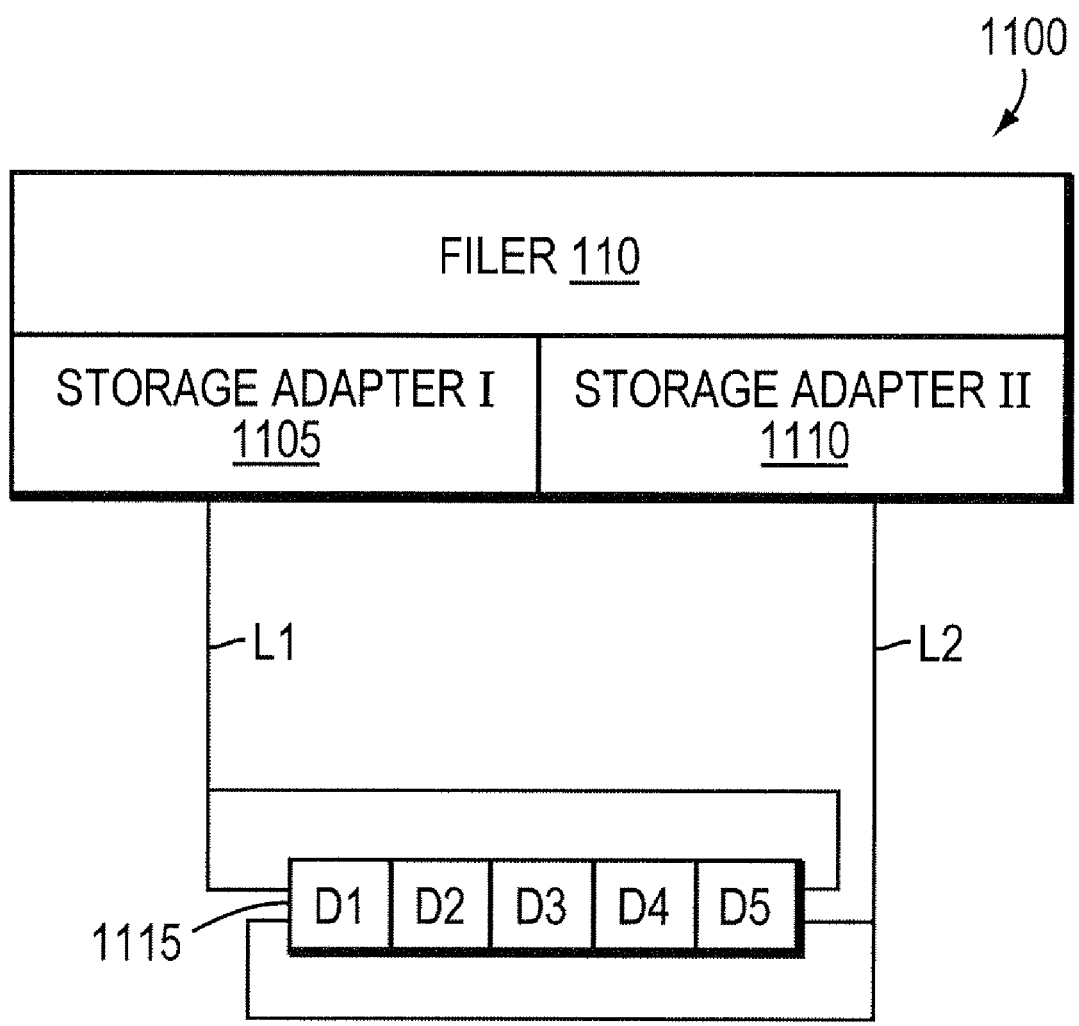
FIG. 11 is a schematic block diagram of an exemplary multi-path environment in accordance with an embodiment of the invention.

FIG. 11 is an illustrative storage system environment 1100 including a filer 110 connected to a disk shelf 1115 via two Fibre Channel loops L1 and L2. The disk shelf 1115 includes disks D1-D5. Loop L1 is connected to storage adapter I (1105) of the filer, while loop L2 is connect to storage adapter II (1110).

In known prior art implementations, an upper level, for example the RAID level of a storage operating system, would contain information (or "know") that disk D2 was connected via loop L1 and storage adapter I (1105). In the event of a failure of either loop L1 or storage adapter I (1105), the upper level service could potentially fail or generate error conditions as the upper level service would not "know" of the alternate path to disk D2. Thus, in known implementations, even though the low level routing or disk driver layers of a storage operating system could generate the multi-path information and effectively fail over to a redundant data path, upper level layers would not be alerted to such failovers.

In accordance with teachings of this invention, the upper level service could have access via the application program interface (API) 332 (see FIG. 3) to the particular device in path instances. Thus, for example the RAID layer could access a device instance associated with disk D2 and its associated path instances. By accessing such information, the RAID layer would be capable of determining that an alternate path exists from the filer 110 to disk D2, namely via the storage adapter II (1110) through loop L2 and to the disk shelf 1115. The information contained in the linked list of path instances can thus be passed to the upper level services for their use.

The user interface of a file server is another example of an upper level service utilizing the data generated and stored by the routing administrator layer. A user interface could, for example, provide commands to enable a user to determine if the storage operating system is optimally configured for maximum fault tolerance. These exemplary commands or processes would obtain routing information via the API to the routing administration layer to ensure that each storage device has at least two data paths and that the paths do not have a single-path-of-failure.

The foregoing has been a detailed description of the illustrative embodiments in the invention. Various modifications and additions can be made without departing from the spirit and scope of the invention. For example, the various data structures can include additional fields and/or be created and maintained by other layers of a storage operating system. Furthermore, it is expressly contemplated that the various data structures including device and path instances can be exposed to upper level services by alternate means other than an application program interface. Finally, it is expressly contemplated that any of the functions, procedures or processes described herein can be implemented using hardware, firmware or software, consisting of computer-readable medium including program instructions executing on a computer, where a combination of hardware, firmware and/or software. Accordingly this description is meant to be taken only by way of example, and not to otherwise limit the scope of the invention.

What is claimed is:

1. A method for performing an input/output operation to a storage device operatively connected to a computer, comprising:
   updating one or more data paths of one or more data structures associated with one or more storage devices;
   identifying a first data path to the one or more storage devices with the one or more data structures;
   identifying a second data path to the one or more storage devices with the one or more data structures; and
   accessing, by one or more upper level services of an operating system of the computer, lower-level routing information associated with the first and second data paths of the one or more data structures, wherein the one or more upper level services is selected from a group consisting of a file system, a user interface, a RAID level, and a class storage device driver.

2. The method of claim 1 further comprising dynamically generating one or more of the data paths in response to a Fibre Channel loop initialization event.

3. The method of claim 1 further comprising:
   selecting, as the first data path, a last used data path associated with the one or more storage devices.

4. The method of claim 1 wherein the one or more storage devices comprises a disk.

5. The method of claim 1 further comprising operatively connecting the computer with the one or more storage devices by a Fibre Channel Loop.

6. The method of claim 1 wherein the computer comprises a storage system.

7. The method of claim 1 further comprising:
   detecting a change to one or more of the data paths; and
   updating the lower-level routing information of the one or more data structures in response to detecting the change.

8. The method of claim 1 further comprising utilizing a Fibre Channel connection as at least one of the data paths.

9. The method of claim 1 further comprising:
   performing the input/output operation using the first data path; and
   performing the input/output operation using the second data path in response to a failure of the input/output operation using the first data path.

10. The method of claim 1 further comprising linking the second data path to a path instance of the one or more data structures.

11. A computer configured to execute a storage operating system, comprising:
    a processor operatively connected with the computer configured to execute the storage operating system, the storage operating system configured to update one or more data structures associated with one or more storage devices operatively connected to the computer;
    a first field of the one or more data structures configured to identify a first data path to the one or more storage devices;
    a second field of the one or more data structures configured to identify a second data path to the one or more storage devices; and
    one or more upper level services of the storage operating system configured to access lower-level routing information associated with the first and second data paths of the one or more data structures, wherein the one or more upper level services is selected from a group consisting of a file system, a user interface, a RAID level, and a class storage device driver.

12. The computer of claim 11 wherein the storage operating system comprises an application program interface configured to provide the one or more upper level services access to the one or more data structures.

13. The computer of claim 11 wherein the storage operating system comprises a routing administration level.

14. The computer of claim 11 wherein one or more of the data paths is generated in response to a Fibre Channel loop initialization event.

15. The computer of claim 11 wherein a last used data path associated with the one or more storage devices is selected as the first data path.

16. The computer of claim 11 wherein the one or more storage devices comprises a disk.

17. The computer of claim 11 further comprising a Fibre Channel Loop configured to interconnect the computer with the one or more storage devices.

18. The computer of claim 11 wherein the computer comprises a storage system.

19. The computer of claim 11 wherein the lower-level routing information of the one or more data structures is configured to be updated in response to a detected change to one or more of the data paths.

20. The computer of claim 11 further comprising utilizing a Fibre Channel connection as one of the data paths.

21. The computer of claim 11 wherein the storage operating system is configured to perform the input/output operation using the second data path in response to a failure of the input/output operation using the first data path.

22. The computer of claim 11 wherein the second data path field is linked to a path instance of the one or more data structures.

23. A computer configured to execute a storage operating system, comprising:
- a processor operatively interconnected with the computer configured to execute the storage operating system, the storage operating system comprising an application program interface;
- a first field of a data structure configured to identify a first data path to a storage device operatively connected to the computer;
- a second field of the data structure configured to identify a second data path to the storage device; and
- the application program interface configured to provide one or more upper level services of the storage operating system access to lower-level routing information associated with the first and second data paths of the data structure, wherein the one or more upper level services is selected from a group consisting of a file system, a user interface, and a RAID level.

24. The computer of claim 23 wherein the lower-level routing information of the data structure is configured to be dynamically updated in response to a detected change to at least one of the data paths.

25. The computer of claim 23 wherein the storage operating system comprises a file system.

26. A computer configured to execute a storage operating system, comprising:
- a processor operatively interconnected with the computer configured to execute the storage operating system;
- a first field of a data structure configured to identify a first data path to a storage device coupled to the computer;
- a second field of the data structure configured to identify a second data path to the storage device; and
- an application program interface of the storage operating system configured to provide one or more upper level services of the storage operating system access to lower-level routing information associated with the first and second data paths of the data structure, wherein the one or more upper level services is selected from a group consisting of a file system, a user interface, a RAID level, and a class storage device driver.

27. The computer of claim 26 wherein the lower-level routing information of the data structure is configured to be dynamically updated in response to a detected change to at least one of the data paths.

28. The storage operating system of claim 26 wherein one or more lower levels of the storage operating system are configured to generate the data structure.

29. A computer-implemented method for performing an input/output operation to a storage device operatively connected to a computer, comprising:
- identifying a first data path to the storage device with one or more data structures;
- identifying a second data path to the storage device with the one or more data structures; and
- accessing lower-level routing information associated with the first and second data paths of the one or more data structures by one or more upper level services of an operating system of the computer through an application program interface of the operating system, wherein the one or more upper level services is selected from a group consisting of a file system, a user interface, a RAID level, and a class storage device driver.

30. A computer-readable storage medium containing executable program instructions executed by a processor, comprising:
- program instructions that update one or more data paths of a data structure associated with a storage device operatively connected to a computer;
- program instructions that identify a first data path to the storage devices with the data structure;
- program instructions that identify a second data path to the storage device with the data structures; and
- program instructions that access, by one or more upper level services of an operating system of the computer, lower-level routing information associated with the first and second data paths of the data structure, wherein the one or more upper level services is selected from a group consisting of a file system, a user interface, a RAID level, and a class storage device driver.

* * * * *

UNITED STATES PATENT AND TRADEMARK OFFICE
CERTIFICATE OF CORRECTION

| | | |
|---|---|---|
| PATENT NO. | : 7,908,523 B1 | Page 1 of 1 |
| APPLICATION NO. | : 12/783964 | |
| DATED | : March 15, 2011 | |
| INVENTOR(S) | : Anthony F. Aiello et al. | |

It is certified that error appears in the above-identified patent and that said Letters Patent is hereby corrected as shown below:

Correct as follows:

In Col. 7, line 12:
mode inode file using the mode inode number to access an appropriate In Col. 7, line 41:
ing, that switch 51 S1 and S2 are accessible by various file In Col. 7, line 44:
shelf 402 is still accessible via switch 51 S1. Similarly, switch S2

In Col. 14, line 33:
storage devices device with the data structure;

Signed and Sealed this
Seventh Day of February, 2012

David J. Kappos
*Director of the United States Patent and Trademark Office*